United States Patent [19]

Berardi

[11] Patent Number: 5,457,507
[45] Date of Patent: Oct. 10, 1995

[54] SELF-CONTAINED ELECTROLUMINESCENT BACK-LIT CLAP BOARD/SLATE

[76] Inventor: Philip N. Berardi, 1231 Euclid Ave. - #4, Santa Monica, Calif. 90404

[21] Appl. No.: 304,860

[22] Filed: Sep. 13, 1994

[51] Int. Cl.[6] .......................... G03B 31/00; G03B 21/32
[52] U.S. Cl. .................... 352/3; 352/90; 40/546; 362/31; 362/98; 362/155; 362/253; 340/332
[58] Field of Search ..................... 352/3, 22–24, 352/90, 244; 40/492, 546; 434/416; 362/31, 98, 99, 155, 812, 253; 340/332, 309.15

[56] References Cited

U.S. PATENT DOCUMENTS

| | | | |
|---|---|---|---|
| 1,320,537 | 11/1919 | Dimond | 362/99 |
| 3,528,731 | 9/1970 | Bird | 352/90 |
| 3,738,239 | 6/1973 | Higuchi | 362/5 |
| 3,781,536 | 12/1973 | Naeseth et al. | 362/34 |
| 3,832,556 | 8/1974 | Schroeder | 250/462.1 |
| 3,879,611 | 4/1975 | Schroeder | 250/462.1 |
| 3,978,340 | 8/1976 | Schroeder | 250/462.1 |
| 4,024,404 | 5/1977 | Schroeder | 250/462.1 |
| 4,050,793 | 9/1977 | Hoadley | 352/5 |
| 4,153,927 | 5/1979 | Owens | 362/99 |
| 4,172,333 | 10/1979 | Towsend | 40/544 |
| 4,195,431 | 4/1980 | Neufeld | 40/544 |
| 4,255,873 | 3/1981 | Eberle | 434/82 |
| 4,266,164 | 5/1984 | Schroeder | 315/169.1 |
| 4,491,899 | 1/1985 | Fleming | 362/74 |
| 4,912,611 | 3/1990 | Lyle | 362/156 |
| 5,083,242 | 1/1992 | Piotrowski | 362/34 |
| 5,126,632 | 6/1992 | Parker | 313/634 |
| 5,198,723 | 3/1993 | Parker | 313/634 |
| 5,283,968 | 2/1994 | Williams | 40/546 |

OTHER PUBLICATIONS

Eltech, "High Performance, Low Cost, Printed EL Lamps", Undated.
Durel Corporation, "Durel 3 Electroluminescent Lamps", 1991.
BKL, Inc., "BKL's Winning Combination: Better, Brighter EL Lamps That Last Longer and Are Cost–Effective", 7–91, 1–92, 3–94.
Loctite Luminescent Systems, Inc., "You Can Do More With Our EL Lamps Than Any Other Light", 1989.

*Primary Examiner*—Michael L. Gellner
*Assistant Examiner*—Eddie C. Lee
*Attorney, Agent, or Firm*—Jones, Day, Reavis & Pogue

[57] ABSTRACT

The present invention relates to a back lighted clap board or slate used for the identification of rolls, takes, and scenes and like information in the making of films that is back-lit with an electroluminescent panel. The electroluminescent panel is activated by the movement of the clap board arms with respect to each other such that, when the arms open, the electroluminescent panel is illuminated. A timing circuit determines the length of time the electroluminescent panel will be lit. Either a mechanically actuated switch or a Hall effect switch may be used to control the illumination of the electroluminescent panel. In addition, a photodiode may be used to detect light intensity and activate the circuit only when the light falls below a predetermined intensity.

14 Claims, 2 Drawing Sheets

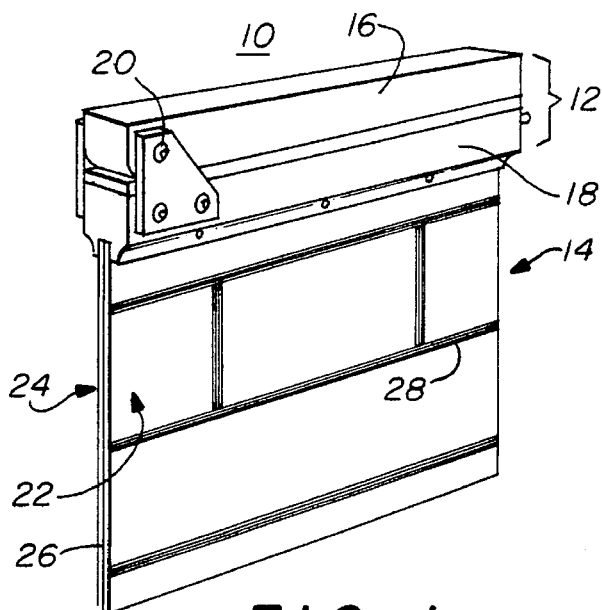
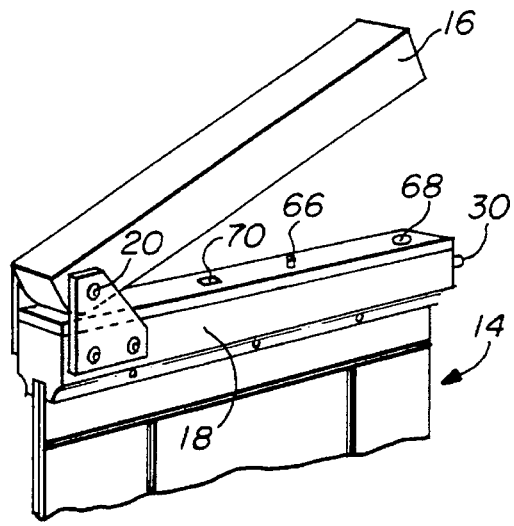
FIG. 1　　FIG. 6
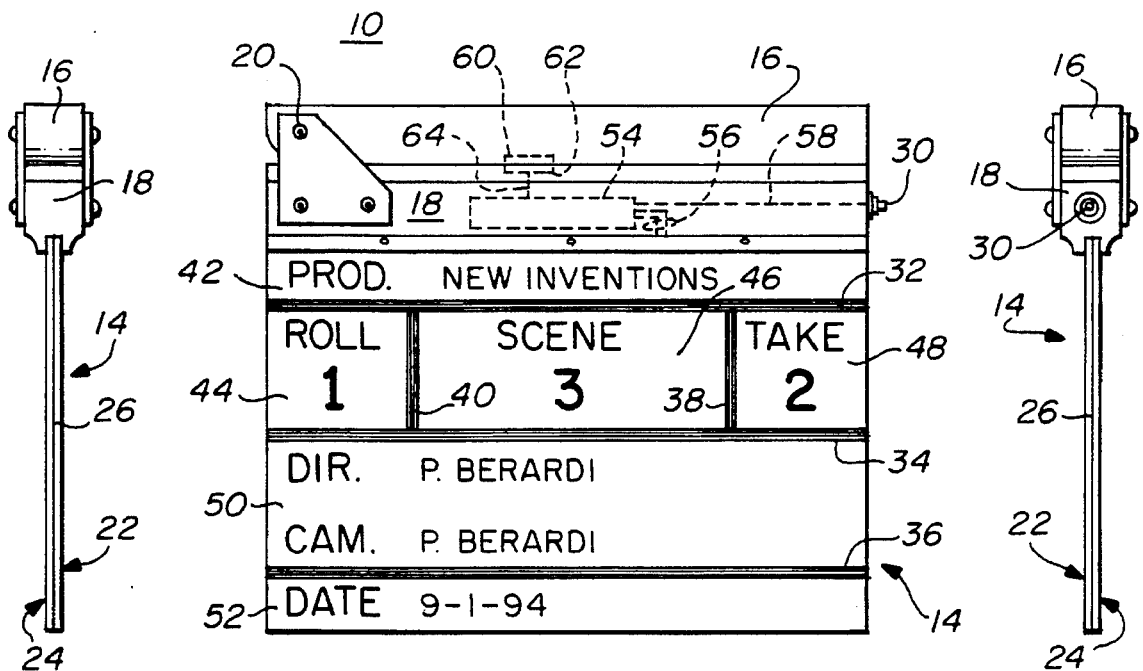
FIG. 4　　FIG. 3　　FIG. 5
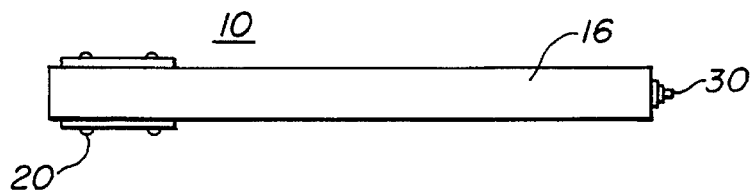
FIG. 2

SELF-CONTAINED ELECTROLUMINESCENT BACK-LIT CLAP BOARD/SLATE

BACKGROUND OF THE INVENTION

1. Field of the Invention

The present invention relates in general to electroluminescent panels and specifically relates to a self-contained electroluminescent back-lit clap board/slate or reusable writing board or surface that is used for the introduction of rolls, takes, and scenes in the making of movies and video films.

2. Description of Related Art

In the making of movies and video films, where various rolls, takes, and scenes are involved, a camera assistant typically marks a slate board with dry-erase pen to indicate the roll number, scene number, take number, and other important information. The assistant, in such case, marks the clap board/slate with the appropriate information and must open the movable arm of the clap board/slate, call attention to the operation that is about to take place, and force the movable arm against the stationary arm to create an audio que (sound track) for matching to the visual que (film/video) for editing purposes to synchronize sound tracks with scenes, takes, etc. and with film/video scenes, takes, etc. as recorded on the clap board/slate surface. Very often the camera assistant is using such slate in a low-light or no-light situation. In the low-light or no-light situation, a slate light has been used in the past. This is a small light that requires batteries or alternating current and an operator who must try to hold the light on the clap board while it is being operated by the camera assistant. Other solutions to the problem have been the use of small flashlights by the operator. The operator attempts to keep the clap board illuminated with the flashlight or the small slate light while it is being held and operated by the camera assistant. The problem with these solutions is that the light does not evenly cover the slate and it is difficult to hold steady on the slate or clap board.

It would be advantageous to have a clap board that has self-contained illumination for improved brightness and visibility of the clap board/slate.

SUMMARY OF THE INVENTION

The present invention solves the problems incurred in the prior art by providing a self-contained electro luminescent back-lit clap board or slate or reusable writing board or surface made of transparent or semitransparent Plexiglas™, fiberglass or similar material that may be used with a dry-erase marking pen (overhead projector pen), fluorescent dry-erase marking pen, or other nonpermanent writing utensil.

The clap board is a typical clap board having first and second parallel abutting elongated arms pivotally attached to each other at one end in a jaw-like configuration such that a first one of the arms can be pivotally opened and closed with respect to the second one of the arms. A rectangular plastic sheet is attached to and extends perpendicularly from the second arm while remaining parallel to the longitudinal axis of the second arm. A printed design is formed on one side of the plastic sheet including predetermined printed indicia such as roll, scene, take, director, cameraman, date, and production title. It also has predetermined areas around and associated with such printed indicia for adding written indicia pertinent to the filming sequence. In other words, associated with "production" is a space in which the title of the production can be entered; in the space associated with roll, the number of the roll can be entered; in the area associated with the printed indicia, "scene", a number can be entered for the scene; and in the area associated with the word "take", a number can be entered representing the take number in process. In the other associated areas, of course, the name of the director, the name of the cameraman, and the date can be entered. In order to make this clap board self-contained and illuminating, a light-generating sheet is associated with the rectangular plastic sheet and an electronic circuit is placed within one of the arms and is connected to the light-generating sheet for energizing the light-generating sheet to eliminate the rectangular plastic sheet and make visible in the dark the printed design and predetermined areas with any written indicia pertinent to the filming sequence. A manually operated switch may be used to energize the light-generating sheet or the device may be constructed such that only when the first arm is pivotally open with respect to the second arm is the circuit connected to the light-generating sheet for illuminating the sheet with the indicia thereon.

The rectangular plastic sheet may be formed of transparent or semi-transparent Plexiglas™, fiberglass, or similar materials on which a dry-erase marking pen could be used to enter pertinent data. The light-generating sheet may be an electroluminescent panel that is attached to the rectangular plastic sheet either adhesively or laminated, or otherwise attached to the back of the rectangular plastic sheet. It may be sandwiched between the plastic sheet and a second sheet that may be of any desired material, including plastic. The electronic circuit for providing power to the light-generating sheet is contained in the interior of one of the parallel arms to which the rectangular plastic sheet and its associated light-generating sheet are attached. The electronic circuit comprises a battery, a power circuit coupled to the electroluminescent panel and a switch coupled between the battery and the power circuit with the switch being actuated by pivoting the first arm with respect to the second arm to energize the power circuit and illuminate the electroluminescent panel. The switch may be a manually operated switch, a mechanically operated switch that is operated by opening and closing the first and second arms with respect to each other, or an electrically operated switch such as a permanent magnetic and a Hall effect switch in the first and second arms, respectively, and abutting each other to cause the illumination only when the first arm is moved with respect to the second arm. In addition, a timing circuit may be included between the battery and the electronic circuit such that the electroluminescent panel, when illuminated, is illuminated only for a predetermined period of time to conserve power in the event the clap board first and second arms are left in the open position with respect to each other. If desired, the timing circuit may be made adjustable to set the predetermined period of time that the electroluminescent panel is illuminated. The circuit may also include an ambient light-responsive device of any type such as a photodiode connected between the battery and the electronic switch such that the electronic circuit will be actuated only when ambient light falls below a predetermined level thus conserving power. Of course, the switch may be manually operated to override all of the other circuits and illuminate the electroluminescent panel so long as the switch is actuated.

Thus, it is an object of the present invention to provide an illuminated clap board for use in filming sequences taken in low-level lighting situations that is self-contained and does not require any separate lighting source.

It is also an object to the present invention to provide a self-contained illuminated clap board that utilizes a light-generating sheet in the form of an electroluminescent panel.

It is still another object of the present invention to provide a self-contained illuminating clap board having an electroluminescent panel that is illuminated by an electronic circuit that comprises a battery, a power circuit coupled to the electroluminescent panel, and a switch coupled between the battery and the power circuit such that the switch is activated by pivoting the first arm of the clap board with respect to the second arm to energize the power circuit and illuminate the electroluminescent panel.

It is yet another object of the present invention to provide a self-contained electroluminescent clap board that utilizes a mechanical switch including a projection extending upwardly from the second arm of the clap board such that when the first arm is abutting and parallel to the second arm, the switch projection is depressed to de-energize the electronic circuit and, when the first arm is pivoted away from the second arm, the switch projection activates the electronic circuit to illuminate the electroluminescent panel.

It is also an object of the present invention to provide a self-contained electroluminescent panel having a switch to illuminate the panel and wherein the switch includes a permanent magnet in the movable arm of the clap board and a Hall effect switch in the stationary arm of the clap board that is adjacent the permanent magnet when the first and second arms are parallel and abutting such that the Hall effect switch is opened and a battery is disconnected from the electronic circuit and when the first and second arms are pivoted apart with respect to each other, the Hall effect switch is closed and the battery is connected to the electronic circuit to illuminate the electroluminescent panel.

It is a further object of the present invention to provide a self-contained illuminated clap board that has a timing circuit coupled between the battery and the electronic circuit such that the electroluminescent panel, when illuminated, is illuminated only for a predetermined period of time to conserve power in the event the clap board first and second arms are left in the open position with respect to each other.

It is still another object of the present invention to provide a self-contained illuminated clap board that has an ambient light-responsive device such as a photodiode connected between a power source and a switch such that the electronic circuit can be activated only when the ambient light falls below a predetermined level thus conserving power when there is sufficient light to read the clap board.

Thus the present invention relates to a self-contained illuminated clap board for use in filming sequences taken in dark or low-level light and comprising first and second parallel, abutting elongated arms pivotally attached to each other at one end in a jaw-like configuration such that the first arm can be pivotally opened and closed with respect to the second arm. A rectangular plastic sheet is attached to and extends perpendicularly from the second arm while remaining parallel to the longitudinal axis of the second arm. A printed design is formed on one side of the plastic sheet including predetermined printed indicia and related predetermined areas for adding written indicia pertaining to the filming sequence. A light-generating sheet is formed as part of the rectangular plastic sheet and the device includes an electronic circuit within one of the arms that is connected to the light-generating sheet for energizing the light-generating sheet to illuminate the rectangular plastic sheet and make visible in the dark the printed design and predetermined areas with any written indicia pertinent to the filming sequence only when the first arm is pivotally opened with respect to the second arm.

BRIEF DESCRIPTION OF THE DRAWINGS

These and other more detailed objects of the present invention will be more fully disclosed in the following DETAILED DESCRIPTION OF THE DRAWINGS in which:

FIG. 1 is an isometric view of the novel self-contained illuminated clap board;

FIG. 2 is a top view of the self-contained illuminated clap board;

FIG. 3 is a side view of the self-contained illuminated clap board illustrating predetermined printed indicia and associated predetermined areas with added written indicia pertinent to the filming sequence;

FIG. 4 is a left-end view of FIG. 3;

FIG. 5 is a right-end view of FIG. 3;

FIG. 6 is an isometric view of the upper portion of the novel clap board device illustrating the upper or movable clap board arm in a pivoted open relationship relative to the lower or stationary clap board arm;

DETAILED DESCRIPTION OF THE DRAWINGS

Figure 7:
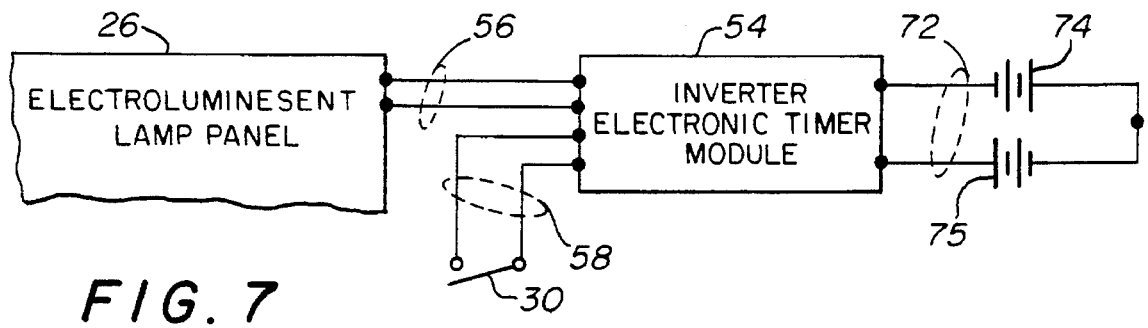
FIG. 7 is a block diagram illustrating the electroluminescent panel coupled to the electronic circuit including an inverter and electronic timer module.

FIG. 1 is an isometric view of the novel self-contained illuminated clap board 10. It comprises an upper clap board portion 12 and a lower back-lighted slate 14. The clap board portion 12 includes an upper elongated hollow arm 16 rectangular in cross section and pivotally attached at pivot point 20 to a lower stationary arm 18 that is also rectangular in cross section. The slate board 14 may be comprised of first and second transparent or semi-transparent plastic material panels 22 and 24 in between which is sandwiched an electroluminescent panel 26. Of course, the electroluminescent panel may be laminated to the plastic panel 22 or it may be adhesively attached thereto. A circuit, to be shown later in conjunction with FIGS. 3 and 4, is arranged in the hollow arm 18 for connection to the electroluminescent panel 26 to energize it. The slate or transparent plastic portion 22 has printed indicia thereon in the form of separation lines 28 to separate the panel 22 into various areas for use as will be shown hereafter.

FIG. 2 is a top view of the novel clap board 10 illustrating the pivot point 20, the upper arm 16, and a manually operated switch 30 which may be used to energize the electroluminescent panel as will be described hereafter.

FIG. 3 is a side view of the novel self-contained illuminated clap board 10 illustrating the plastic, at least semi-transparent panel 22 being separated by horizontal lines 32, 34, and 36 printed thereon with horizontal lines 32 and 34 also being separated by vertical lines 38 and 40, thereby forming a number of separated areas on panel 22. In area 42, there is printed indicia representing the name of the production which, in this case, is illustrated as "new inventions". In areas 44, 46 and 48, there is printed the words "roll", "scene", and "take" and the written indicia in those respective areas are indicated by the numerals 1, 3, and 2, respectively. In area 50, there is written indicia indicating the name of the director and the cameraman which, as illustrated in FIG. 3, is P. Berardi. Finally, in area 52, there is written indicia indicating the date and written in that area is the date Sep. 1, 1994.

As is well known, when a particular scene is to be taken, the camera assistant calls out the notice, opens the clap board arms as illustrated in FIG. 6, and snaps them closed. The camera then records the information that is on the Plexiglas™ panel 22, both printed and written.

When the light becomes insufficient or darkness approaches, the present invention illuminates the electroluminescent panel 26 so that it can be easily seen and photographed. It functions with a circuit 54 illustrated in phantom lines in FIG. 3 that may be connected to a manually operated switch 30 through the conductor 58 to generate outputs on line 56 that are coupled in a well-known fashion to the electroluminescent panel 26. If desired, different switch arrangements other than the manually operated switch 30 may be used. For instance, as shown in phantom lines in FIG. 3, a permanent magnet 60 may be located in the upper movable arm 16 and a Hall effect switch 62 may be located in the lower hollow arm 18 adjacent and abutting magnet 60 and coupled through line 64 to the circuit 54. When the movable arm 16 is moved away from the fixed arm 18, as illustrated in FIG. 6, the Hall effect switch 62 closes in a well-known manner and energizes a circuit 54 to cause it to illuminate electroluminescent panel 26.

Figure 10:
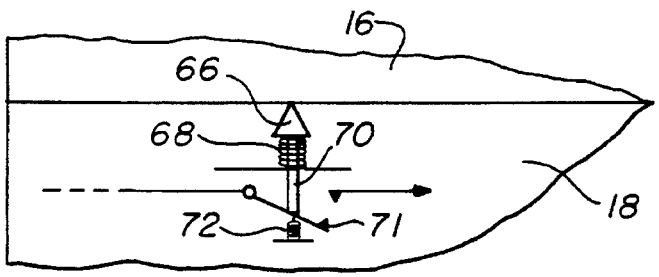
FIG. 10 illustrates a mechanically operated switch in the stationary arm of the clap board and spring-loaded to the upward position such that, in the position shown in FIG. 10, the mechanically operated switch has a projection that is forced downwardly by the upper pivotable arm of the clap board and the switch is opened.
Figure 11:
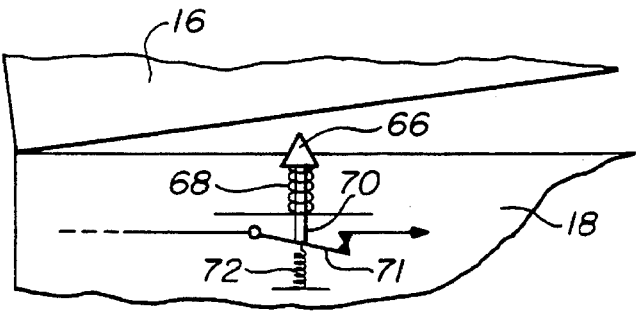
FIG. 11 illustrates the upper or pivotable arm of the clap board moved openly with respect to the stationary arm and the spring-loaded projection rises upwardly and closes the switch to activate the circuit.
Figure 12:
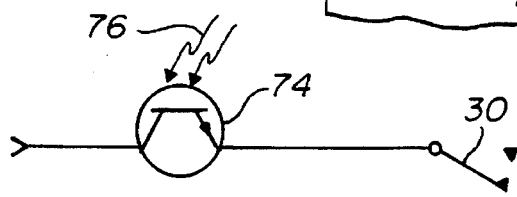
FIG. 12 illustrates a photodiode in series with the switch such that the power will not be coupled to the switch until the ambient light conditions are such that the photodiode will allow current to the switch which may be any one of the switches previously discussed.

As shown in FIG. 6, the area 70 is illustrative of where the Hall effect switch 62 could be located; however, it could be located in other areas. In addition, a mechanically operated switch 66, as shown in FIG. 6, may be formed in and extend through the lower fixed arm 18 (as shown in FIGS. 10 and 11) for operating a mechanical switch according to the movement of arm 16. Thus when the arm 16 is moved inwardly against and parallel to lower arm 18, switch plunger 66 is forced downwardly thus opening the switch and disengaging the circuit as shown in FIG. 10. When the arm 16 has been pivoted upwardly as shown, the plunger 66 is spring-loaded and thus closes the switch as shown in FIG. 12 where there will be shown more details.

FIG. 7 illustrates in block form the electronic section of the present invention to illuminate the electroluminescent panel. Electroluminescent panel 26 is of any well-known type such as those made by Loctite Luminescent Systems, Inc. and are operated by AC signals on line 56 from an inverter electronic timer module 54 that is a shelf item that is also produced by Loctite Luminescent Systems, Inc. and others. It has a switch 30 which could be any of the switches that will be disclosed hereafter that actuate circuit 54 and couple batteries 74 and 75 through line 72 to the inverter 54 to operate it. The inverter converts the DC voltage from the batteries 74 and 75 and to an AC voltage on lines 56 to activate the electroluminescent panel 26. Because this system is old and well known in the art it will not be discussed in any detail herein.

Figure 8:
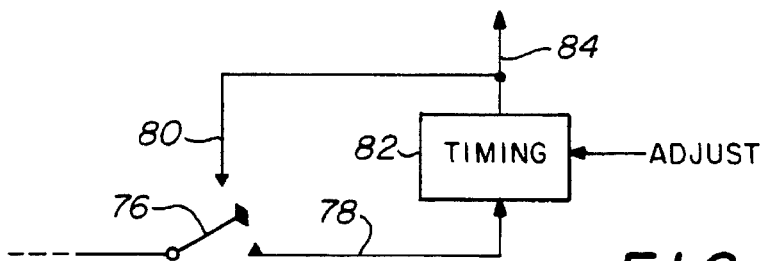
FIG. 8 illustrates a manually operated switch, which is a single-pole double-throw switch in which, in one position, an adjustable timer is included in the circuit to determine the amount of time the electroluminescent panel is on and a second position in which the timer is bypassed and the electroluminescent panel is continually illuminated.

FIG. 8 illustrates one type of switch that may be used in the present invention. Because it is possible to leave the arms 16 and 18 of the clap board in the open position, and because the electroluminescent panel need be illuminated only for a short period of time, a timer 82 may be formed in inverter 54 or may be placed in the circuit after switch 76 to cause circuit 54 in FIG. 7 to be activated and the electroluminescent panel illuminated only for a predetermined period of time. The timer may be made to be adjustable to any desired time in any well-known manner. Switch 76 may be a single-pole double-throw switch such that when it is in a first position coupled to line 78, the timer 82 is in the circuit. However, when it is in its second position making contact with line 80, it bypasses the timer and the electroluminescent panel then stays ON until the switch is placed in an OFF position (not shown).

Figure 9:
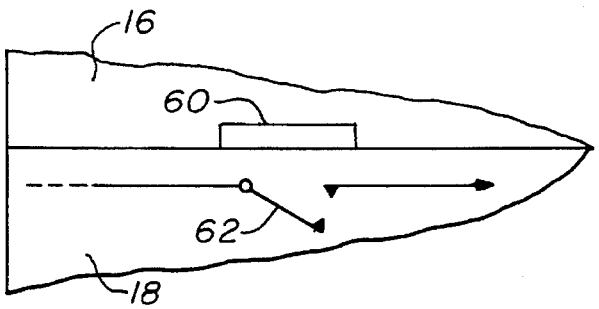
FIG. 9 is a schematic relationship indicating a magnet in the pivotal arm and a Hall effect switch in the stationary arm such that when the arms are in abutting relationship the switch is open and when the arms are in an open relationship with relation to each other the switch is closed.

FIG. 9 illustrates another arrangement of the switching unit that could be used to operate the electroluminescent panel. In this case, it includes a permanent magnet 60 in pivotable arm 16 and a Hall effect switch 62 in the stationary arm 18 in abutting relationship with permanent magnet 60 when first and second arms 16 and 18 are parallel and abutting each other as shown. In this case, the magnet 60 causes the Hall effect switch 62 to be opened, thus deenergizing the circuit and preventing illumination of the electroluminescent panel 26. However, when the arms 16 and 18 are pivoted apart as illustrated in FIG. 6, the magnet 60 moves away from the Hall effect switch 62 and it closes, thus coupling power to the circuit for illuminating the electroluminescent panel 26. Again, however, in this circuit a timer can be used such as in FIG. 8 so that the electroluminescent panel is on for a predetermined period of time and then is extinguished even though the arms 16 and 18 may be left in the open position.

FIGS. 10 and 11 disclose still another type of switch that could be used to operate the electroluminescent panel. In this case, in the lower arm 18 is a mechanical switch 66 that is biased in the upward position by a spring 68. It has a plunger 70 that contacts switch 71 holding it in an open position and compressing spring 62 when the arms 16 and 18 are parallel and in abutting relationship as shown in FIG. 10. When the arms are opened, as indicated in FIG. 11, as arm 16 pivots away from arm 18, spring 68 moves the projection 66 upwardly thus allowing plunger 70 to move away from switch 71 thereby allowing spring 72 to close switch 71 and energize the circuit to the electroluminescent panel. Again, a timer may be placed in the circuit to allow the electroluminescent panel to be illuminated only for a predetermined period of time even though the arms 16 and 18 may be left open.

It is clear from the above description that this unit will work well to overcome the disadvantages of the prior art where an additional operator must hold a light to illuminate the clap board slate in dim light or darkness.

However, an additional feature to conserve power is shown in FIG. 12. As described above, even though the clap board is being used in the daytime when the electroluminescent panel need not be illuminated, each time the arms 16 and 18 on the device are opened as disclosed heretofore, the electroluminescent panel is illuminated thus using battery power when it is not required. Thus the circuit in FIG. 12 is provided in which a light-responsive element 74 such as a photodiode is provided in series with switch 30 or any of the other switches disclosed previously such that as long as there is light of a certain intensity, the light-responsive element 74 does not conduct. However, when the light falls to a predetermined level, the light-responsive element such as photodiode 74 conducts and couples power through switch 30 to the power supply circuit for the electroluminescent panel thus energizing it. However, as long as the light intensity is above that predetermined level, the light-responsive element or photodiode 74 will not conduct and thus the batteries are saved through the daytime operations. It is only when the light falls below the predetermined level that the photodiode 74 conducts and allows operation of the electroluminescent panel. Such circuits, again, are old and well known in the art and will not be disclosed in detail here.

Thus there has been disclosed a novel self-contained illuminated clap board for use in filming sequences taken in insufficient light or darkness. It includes at least one rectangular plastic sheet which may be transparent or semitransparent attached to and extending perpendicularly from the second arm as illustrated in FIGS. 1, 3, 4, and 5. The plastic sheet, although it extends perpendicular from the second arm, remains parallel to the longitudinal axis of the second arm as can be seen in these figures. Attached to the rectangular plastic sheet is a light-generating sheet such as an electroluminescent panel that can be adhesively attached to the transparent panel or that may be laminated with and a part of the plastic sheet. The plastic sheet has printed indicia thereon with areas for entering written indicia pertinent to the printed indicia. The clap board comprises a first upper arm pivotable with respect to the fixed second arm and is used by the camera assistant to get the attention of those involved and to indicate thereon information pertinent to the scene being taken so that the cameras can keep a record by photographing it.

The novel invention includes an electronic circuit housed in the hollow arm to which the electroluminescent panel is attached. A switch selectively couples the electronic circuit to the electroluminescent panel for providing power thereto as needed. The switch may be a mechanical switch that includes a projection extending upwardly from the second arm so that it is actuated by movement of the first arm with respect to the second arm. It may also include a permanent magnet in the first arm with a Hall effect switch in the second arm adjacent the permanent magnet when the first and second arms are parallel and abutting each other such that the Hall effect switch is operated by movement of the first arm with respect to the second arm to energize the electroluminescent panel. In addition, the novel circuit includes a timing unit between the battery and the electronic circuit such that the electroluminescent panel, when illuminated, is illuminated only for a predetermined period of time to conserve power in the event that the clap board first and second arms are left in the open position with respect to each other. The timing circuit may be adjustable to set the predetermined period of time the electroluminescent panel is illuminated.

In addition, there may be an ambient light-responsive device such as a photodiode connected between the battery and the electronic switch such that the electronic circuit can be activated only when ambient light falls below a predetermined level thus conserving power of the unit during the day when the electroluminescent panel is not needed.

While the invention has been described in connection with a preferred embodiment, it is not intended to limit the scope of the invention to the particular form set forth, but, on the contrary, it is intended to cover such alternatives, modification, and equivalents as may be included within the spirit and scope of the invention as defined by the appended claims.

I claim:

1. A self-contained illuminated clap board for use in filming sequences taken with both sufficient and insufficient light and comprising:

first and second parallel, abutting elongated hollow arms pivotally attached to each other at one end in a jaw-like configuration such that said first arm can be pivotally opened and closed with respect to the second arm;

at least one rectangular plastic sheet attached to and extending perpendicularly from said second arm while remaining parallel to the longitudinal axis of said first and second arms;

a printed design on one side of said plastic sheet including predetermined printed indicia and predetermined areas for adding written indicia pertaining to the filming sequence;

a light-generating sheet associated with said rectangular plastic sheet; and an electronic circuit within one of said hollow arms and connected to said light-generating sheet for energizing said light-generating sheet to illuminate said rectangular plastic sheet and make visible in the dark said printed design and predetermined areas with any written indicia pertinent to the filming sequence only when said first arm is pivotally opened with respect to said second arm.

2. An illuminated clap board as in claim 1 wherein said light-generating sheet is an electroluminescent panel.

3. An illuminated clap board as in claim 1 wherein said light-generating sheet is laminated with and a part of said plastic sheet.

4. A self-contained illuminated clap board as in claim 2 wherein said electroluminescent panel is adhesively attached to said rectangular plastic sheet 5. A self-contained illuminated clap board as in claim 1 wherein said plastic sheet containing said writing area is formed of at least partially transparent material.

6. A self-contained illuminated clap board as in claim 2 wherein said electronic circuit is placed in said second hollow arm of said jaw-like arm.

7. A self-contained illuminated clap board as in claim 6 wherein said electronic circuit comprises:

a battery;

a power circuit coupled to said electroluminescent panel; and a switch coupled between said battery and said power circuit, said switch being activated by pivoting said first arm with respect to said second arm to energize said power circuit and illuminate the electroluminescent panel.

8. A self-contained illuminated clap board as in claim 7 wherein said switch is a mechanical switch including a projection extending upwardly from said second arm such that, when said first arm is abutting and parallel to said second arm, said switch projection is depressed to de-energize said power circuit and when said first arm is pivoted away from said second arm said switch projection is released to activate said power circuit to illuminate said electroluminescent panel.

9. A self-contained illuminated clap board as in claim 7 wherein said switch comprises:

a permanent magnet in said first arm; and a Hall effect switch in said second arm adjacent said permanent magnet when said first and second arms are parallel and abutting such that said Hall effect switch is open and said battery is disconnected from said electronic circuit and, when said first and second arms are pivoted apart with respect to each other, said Hall effect switch is closed and said batter is connected to said electronic circuit to illuminate said electroluminescent panel.

10. A self-contained illuminated clap board as in claim 7 further including:

a timing circuit between said battery and said electronic circuit such that said electroluminescent panel, when illuminated, is illuminated only for a predetermined period of time to conserve power in the event said clap board first and second arms are left in the open position with respect to each other.

11. A self-contained illuminated clap board as in claim 10 wherein said timing circuit is adjustable to set the predetermined period of time said electroluminescent panel is illuminated.

12. A self-contained illuminated clap board as in claim 7 further including:

an ambient light-responsive device connected between said battery and said electronic switch such that said electronic circuit can be activated only when ambient light falls below a predetermined level thus conserving power.

13. A self-contained illuminated clap board as in claim 12 wherein the ambient light-responsive circuit is a photodiode.

14. A self-contained illuminated clap board as in claim 7 wherein said switch is a manually operated switch.

* * * * *